US006273320B1

(12) United States Patent
Siebert et al.

(10) Patent No.: US 6,273,320 B1
(45) Date of Patent: Aug. 14, 2001

(54) MEASUREMENT OF PIPE JOINT MISALIGNMENT AT WELD INTERFACE

(75) Inventors: Martin Anton Siebert; Garth Rodney Prentice; Colin Lesly Carter, all of Calgary (CA)

(73) Assignee: Shaw Industries Ltd., Rexdale (CA)

( * ) Notice: Subject to any disclaimer, the term of this patent is extended or adjusted under 35 U.S.C. 154(b) by 0 days.

(21) Appl. No.: 09/641,771

(22) Filed: Aug. 21, 2000

(30) Foreign Application Priority Data

Mar. 24, 2000 (CA) .................................................. 2302106

(51) Int. Cl.⁷ .................................................... B23K 15/00
(52) U.S. Cl. ...................... 228/102; 228/103; 219/124.34
(58) Field of Search ................................. 228/102, 8–12, 228/103; 219/124.34, 137 R, 161, 158; 33/412, 661, 533; 73/661

(56) References Cited

U.S. PATENT DOCUMENTS

| 2,304,313 | * | 12/1942 | Misz . |
| 3,484,667 | * | 12/1969 | Wofsey . |
| 3,697,720 | * | 10/1972 | Christopher . |
| 4,380,695 | * | 4/1983 | Nelson . |
| 4,428,126 | * | 1/1984 | Banks . |
| 4,578,869 | * | 4/1986 | O'Brien . |
| 4,750,662 |   | 6/1988 | Kagimoto . |
| 4,964,224 | * | 10/1990 | Jackson . |
| 5,107,093 | * | 4/1992 | Ekelof et al. . |
| 5,185,937 | * | 2/1993 | Piety et al. . |
| 5,189,798 | * | 3/1993 | La Force . |
| 5,255,857 | * | 10/1993 | Hunt . |
| 5,479,718 | * | 1/1996 | Cook . |
| 5,837,966 | * | 11/1998 | Timmons, Jr. . |
| 6,124,566 | * | 9/2000 | Belloni et al. . |

* cited by examiner

*Primary Examiner*—Tom Dunn
*Assistant Examiner*—Jonathan Johnson
(74) *Attorney, Agent, or Firm*—Ridout & Maybee

(57) ABSTRACT

A method of monitoring the alignment of pipes to be welded end to end involves supporting a reference bar extending generally parallel to, and external of, the pipes so as to span a weld position of which the ends of two pipes are to be welded, performing measurements of perpendicular distance between the bar and each pipe at two predetermined distances from the end of each pipe, determining the thickness of the walls of the pipes, determining the slope of the exterior of each pipe with respect to the reference bar, calculating from the slopes the difference between the distances from the bar to the outer surface of each of the two pipes to the weld position, so as to provide a measure of the misalignment of the outer surface of the pipes at the weld position, differencing the wall thicknesses of the pipes to provide a wall thickness difference, and subtracting the wall thickness difference from the misalignment of the external walls of the pipe to determine the misalignment of the inner surfaces of the pipes at the weld position. It is preferred to measure pipe thicknesses at multiple distances from the end of each pipe and average the results to obtain average thicknesses for the two pipes. The misalignment measurements will usually be repeated at successive points around the periphery of the pipes.

4 Claims, 6 Drawing Sheets

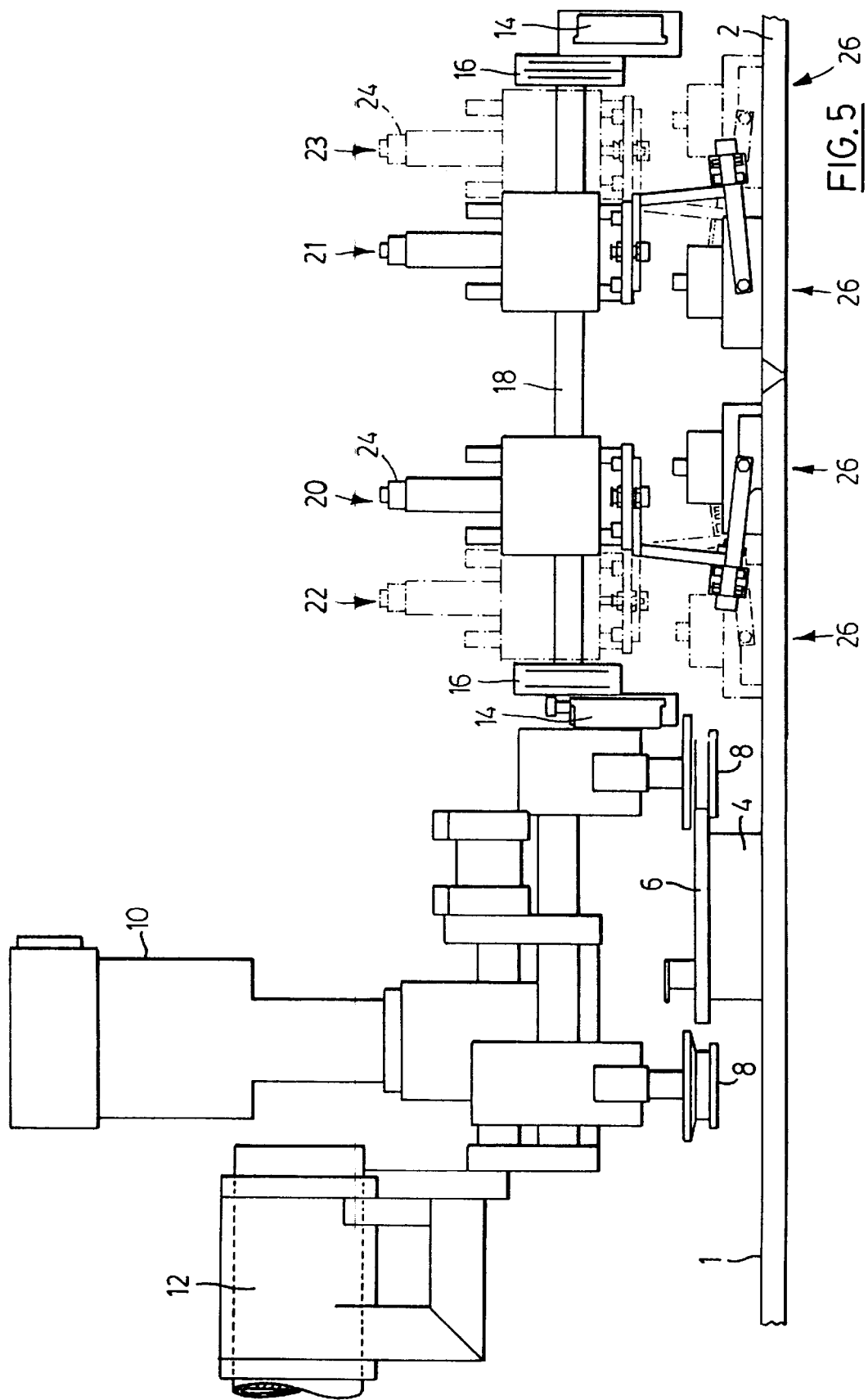

MEASUREMENT OF PIPE JOINT MISALIGNMENT AT WELD INTERFACE

This invention relates to the girth welding of pipes, and, more particularly, to checking the alignment of two lengths of pipes to be welded.

In the construction of some specialty pipelines, it is very important to match the ends of individual pipeline segments at the joints prior to welding. The critical match here is the alignment of the internal pipe wall surfaces. This is a weld area that can significantly impact the weld integrity. In practice, a perfect match is not possible, but specified tolerances must be maintained. FIG. 1 illustrates this situation, showing a misalignment which is referred to as a Hi Lo. Presently, the match between pipes 1 and 2 is measured by mechanical means such as special Hi Lo gauges, bridging bars, micrometers, and calipers. Though this has been adequate, it is only applicable in applications employing an open gap weld profile. The gap assures access to the internal pipe surface prior to welding as can be seen from FIG. 1. New girth weld welding processes require a profile with a closed gap between pipes 1 and 2, as shown in FIG. 2. In this latter case, it is not possible to access the internal surface by mechanical means, and thus existing techniques cannot be used.

An object of the present invention is to provide a Hi Lo scanning technique which can be used in such processes.

According to the invention, a method of monitoring the alignment of pipes to be welded end to end comprises supporting a reference bar extending generally parallel to, and external of, the pipes so as to span a weld position of which the ends of two pipes are to be welded, performing measurements of perpendicular distance between the bar and each pipe a predetermined distance from the end of each pipe, determining the thickness of the walls of the pipes, determining the slope of the exterior of each pipe with respect to the reference bar, calculating from the slopes the difference between the distances from the bar to the outer surface of each of the two pipes to the weld position, so as to provide a measure of the misalignment of the outer surface of the pipes at the weld position, differencing the wall thicknesses of the pipes to provide a wall thickness difference, and subtracting the wall thickness difference from the misalignment of the external walls of the pipe to determine the misalignment of the inner surfaces of the pipes at the weld position. If the thicknesses of the pipe walls are known, then it may be unnecessary to remeasure these values, but it is preferred to measure pipe thicknesses at multiple distances from the end of each pipe and average the results to obtain average thicknesses for the two pipes. The misalignment measurements may be repeated at successive points around the periphery of the pipes. Preferably, the distance measurements are made of two different distances from the end of each pipe to facilitate determination of the slopes of the pipes.

Further features of the invention will become apparent from the following description with reference to the accompanying drawings

IN THE DRAWINGS

FIG. 5 is an elevation of apparatus for effecting the implementation of FIG. 4;

Figure 1:
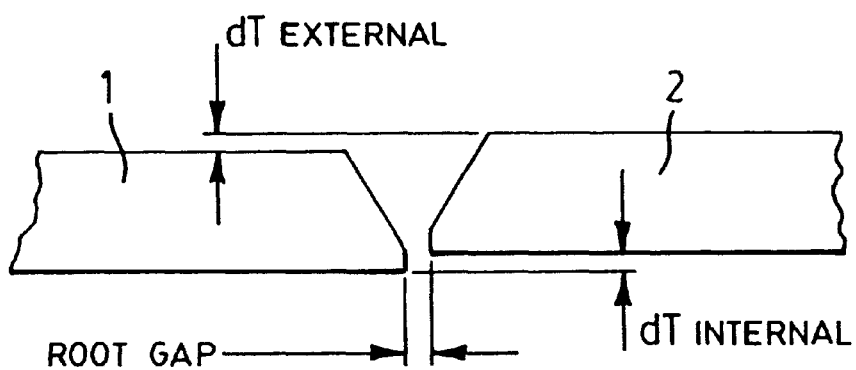
FIG. 1 is a fragmentary cross-section of ends of the walls of two pipes to be welded by an open gap welding technique.
Figure 2:
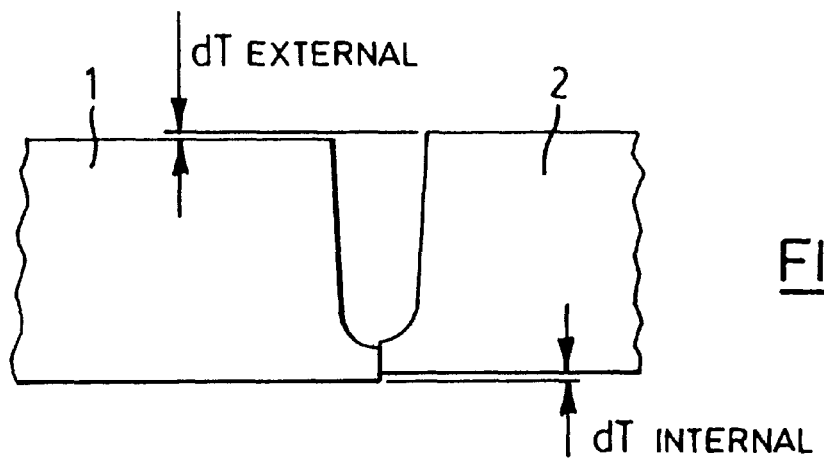
FIG. 2 is a fragmentary cross-section of ends of the walls of two pipes to be welded by a closed gap welding technique.

Referring first to FIGS. 1 and 2, these illustrate the measurements to be made upon two pipes 1 and 2 aligned preparatory to welding, namely the misalignment of the external surfaces (dT external) and, more importantly, the misalignment of the internal surfaces of the pipes (dT internal). In FIG. 1, a root gap is available to obtain measurement access to the internal surfaces of the pipe. No such access is available in FIG. 2.

Figure 3:
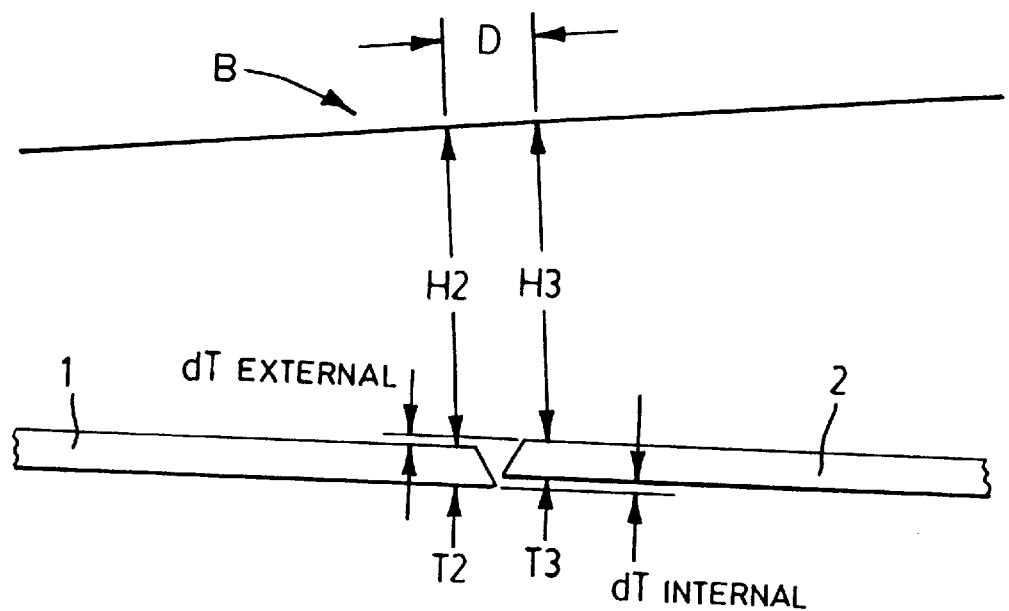
FIG. 3 is a diagram illustrating a basic implementation of the present invention.

FIG. 3 illustrates the operation of a basic form of the invention. Measurements are taken of the distances H2 and H3 between a reference bar B and the outer surfaces of pipes 1 and 2, at points spaced by a distance D spanning the ends of the pipes, and measurements are also made of the thickness T2, T3 of each pipe. The difference between H2 and H3 provides a measure of the misalignment (dT external) of the pipes from which the misalignment (dT internal) can be derived by subtracting the difference between the thickness measurements.

Figure 4:
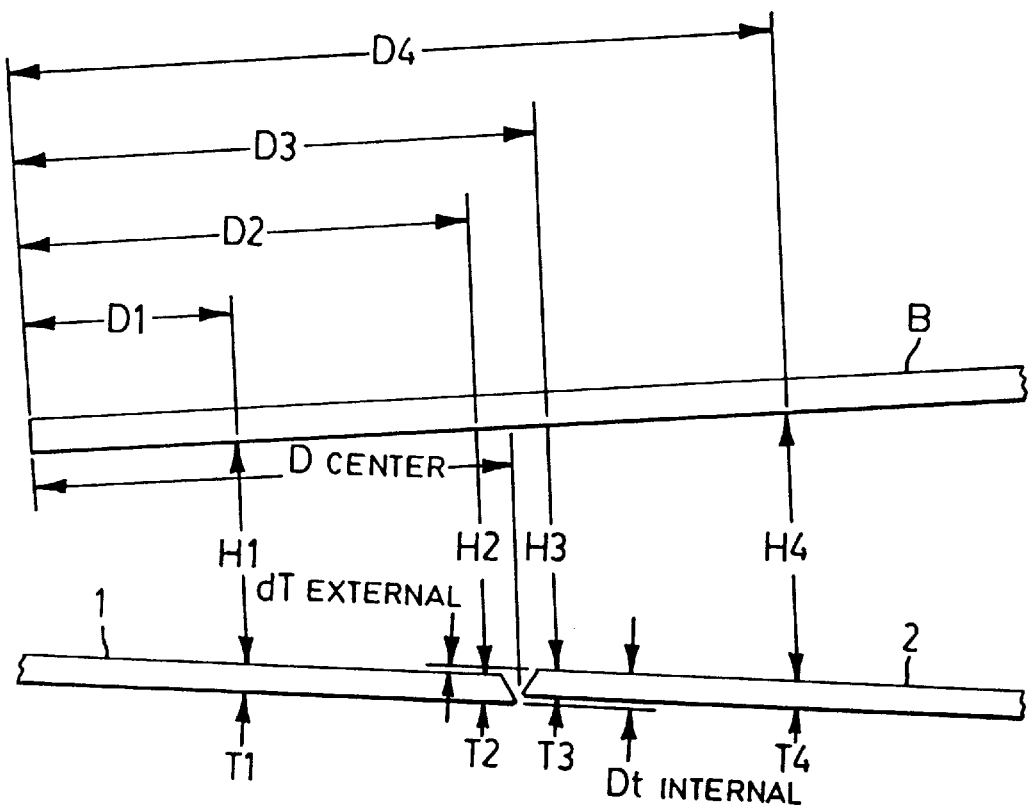
FIG. 4 is a diagram illustrating a preferred embodiment implementation of the present invention.

A problem with this approach is that any misalignment between the bar B and the pipe will affect the measurement. To limit the effects of this degree of freedom, and maintain accuracy, two additional sets of measurements are made, as shown in FIG. 4. The procedure to determine the internal Hi Lo is then as follows (with the variables being those referenced in FIG. 4):

Measure:
  H1,H2,H3,H4 (distance of pipe surface to reference bar),
  D1,D2,D3,D4 (horizontal distances of measure points)
  T1,T2,T3,T4 (pipe wall thickness)
Calculate slope of upstream joint with respect to the reference bar, using D1,D2,H1,H2.
  Ax+B=yup, where x is horizontal displacement from reference point and yup is distance from reference bar to upstream pipe surface
Calculate slope of downstream joint with respect to the reference bar, using D3,D4,H3,H4.
  υ Cx+D=ydown where x is horizontal displacement from reference point and ydown is distance from reference bar to downstream pipe surface.
Calculate both y values (yup and ydown) at distance D center.
Subtract values to determine dT external (external mismatch).
Measure thickness Tup and Tdown from T1 and T2.
Subtract wall thickness values Tup and Tdown.
Calculate internal mismatch by adding wall thickness difference from external mismatch.

A presently preferred embodiment of the invention is described with reference to FIGS. 5–8. Referring to FIG. 5, a scanner assembly is mounted to a pipe 1 of pipes 1 and 2 to be welded so as to engage a girth track 4 secured around the pipe and providing a rack portion 6 of a rack and pinion drive in which the pinions 8 are driven by a motor 10 to step the assembly to different points around the circumference of the pipe. A conduit 12 organizes various electrical and pneumatic connections to the scanner assembly, which for clarity are omitted from the drawing, together with associated pneumatic actuators whose function will be described.

Figure 6A:
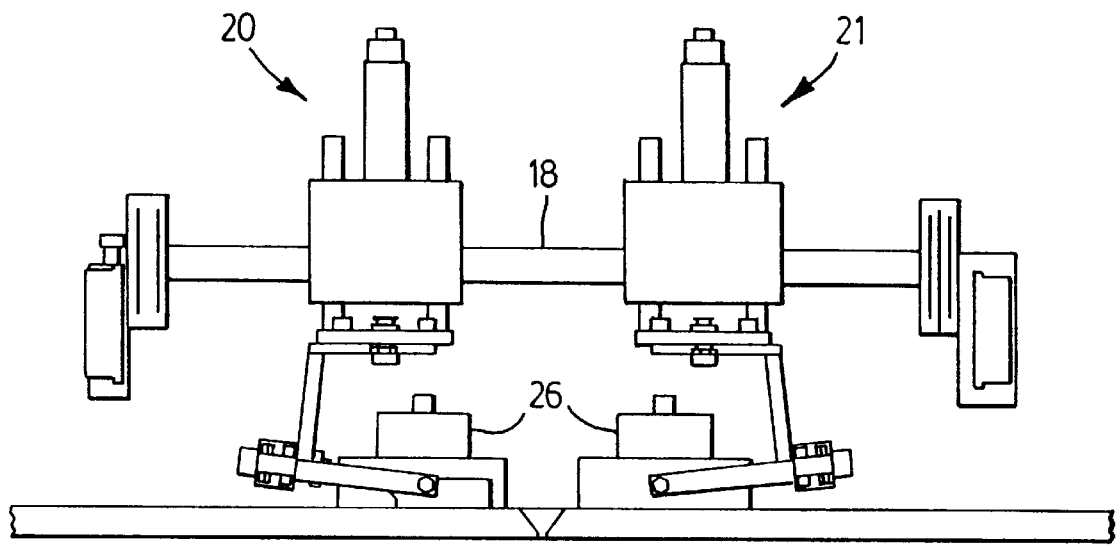
FIGS. 6A and 6B are views corresponding to the right-hand portion of FIG. 5, illustrating the arrangement of different pairs of transducer heads incorporated in the apparatus.
Figure 6B:
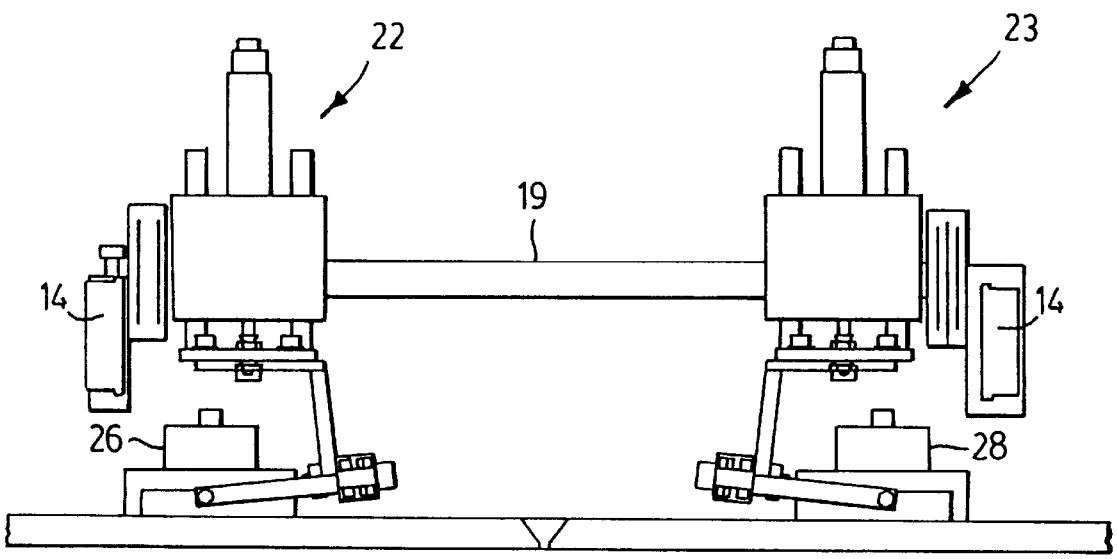
Figure 7:
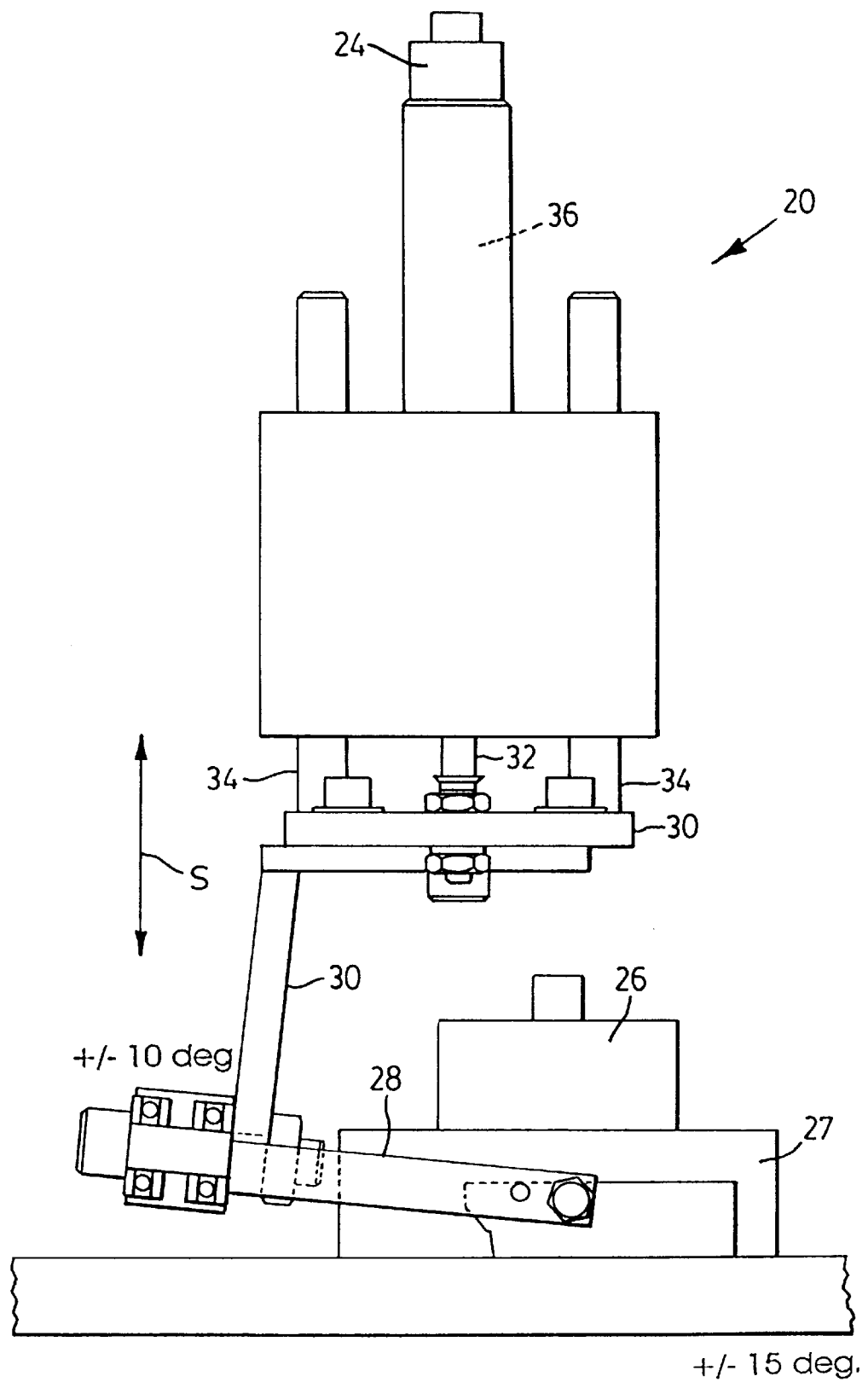
FIG. 7 is an enlarged view of a transducer head.

A sub-frame 14 supports, through adjustment slots 16, two parallel reference bars 18 and 19 supporting measurement heads 20 and 21, and 22 and 23 respectively. The measurement heads each include an ultrasonic ranging device 24 (other distance measuring technologies could be used), and a swivel mounted device 26 applied to the surface of the pipe through a delay wedge 27 for measuring its thickness. The heads 20 and 22 are locked to the reference bars in the positions as shown, and the devices 26 are mounted to the heads by first arms 28 connected to the devices 26 through pivots allowing the devices to hit in an axis perpendicular to the bars 18 and 19, and second arms 30 attached to the heads, in which the first arms are journalled for rotation about an axis approximately parallel to the bars 18 and 19, thus allowing the devices 26, or more accurately their delay wedges 27, to lie flat against the pipe surface while limiting movement of crossheads 30 towards the pipe (see FIG. 7). FIG. 6A shows the heads 20 and 21 and the bar 18 and FIG. 6B shows the heads 22 and 23 and the bar 19.

Each head contains a hydraulic cylinder 36 having a piston of which the piston rod 32 is attached to the crosshead 30 which is further guided by rails 34. The ranging device 24 comprises a transducer mounted at an upper end of the cylinder 36 so as to measure the distance to the piston of the hydraulic cylinder as the latter moves the crosshead through a stroke S between a reference position relative to the bars 18 and 19, and a position in which the delay wedge is pressed against the pipe. The distance between these two points, adjusted by a constant, provides the distance between the reference bars 18 and 19 and the pipe, without measurement being obstructed by the devices 26. The devices 26 apply ultrasonic pulses to the pipe through the delay wedges 27 and measure the time lapse between received pulses due to successive reflections within the pipe wall to ascertain the thickness of the latter.

Figure 8:
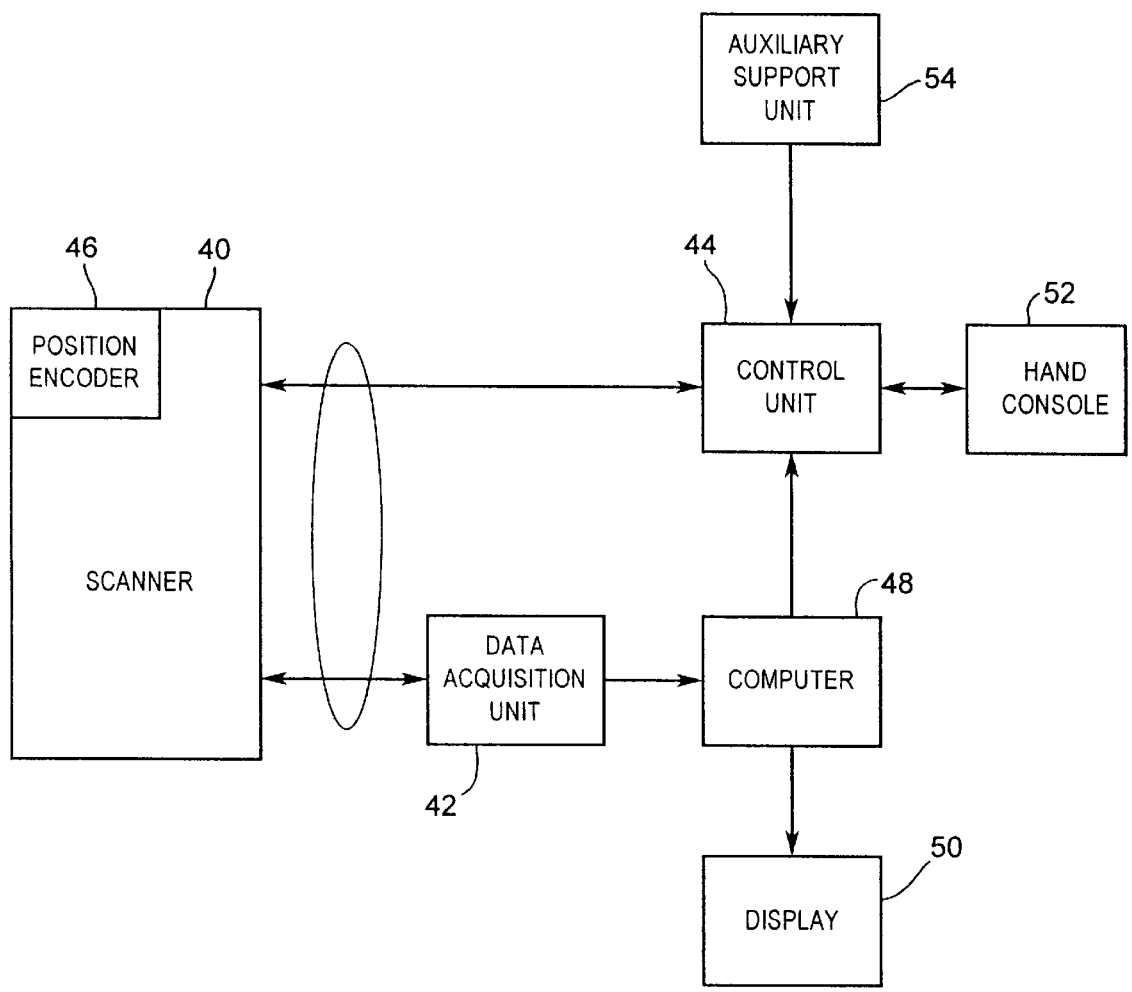
FIG. 8 is a block diagram of control and data recovery apparatus associated with the apparatus of FIG. 5.

Referring now to FIG. 8, signals from the scanner unit 40 already described, namely received signals from the various transducers, are processed to obtain bar-to-pipe and pipe thickness data stored by a data acquisition unit 42, a control unit 44 providing transmit signals to the transducers and also controlling actuation of the cylinders 36 as well as the motor 10. A position encoder 46 generates signals indicating the position of the scanner unit on the track 4, and passes the data to the unit 42. The data from unit 42 is passed to a computer 48 which processes it and displays the results on a monitor 50. Alternately, a hand console 52 may be used to control the system from adjacent the weld location. An auxiliary support unit 54 provides fluid to operate the hydraulic cylinder, and power to operate the motor and transducers.

We claim:

1. A method of monitoring the alignment of pipes to be welded end to end comprising supporting a reference bar extending generally parallel to, and external of, the pipes so as to span a weld position of which the ends of two pipes are to be welded, performing measurements of perpendicular distance between the bar and each pipe a predetermined distance from the end of each pipe, determining the thickness of the walls of the pipes, determining the slope of the exterior of each pipe with respect to the reference bar, calculating from the slopes the difference between the distances from the bar to the outer surface of each of the two pipes to the weld position, so as to provide a measure of the misalignment of the outer surface of the pipes at the weld position, differencing the wall thicknesses of the pipes to provide a wall thickness difference, and subtracting the wall thickness difference from the misalignment of the external walls of the pipe to determine the misalignment of the inner surfaces of the pipes at the weld position.

2. A method according to claim 1, including measuring pipe thicknesses at multiple distances from the end of each pipe and average the results to obtain averaging thicknesses for the two pipes.

3. A method according to claim 2, wherein the misalignment measurement is repeated at successive points around the periphery of the pipes.

4. A method according to claim 2, wherein the distance measurements are made of two different distances from the end of each pipe.

* * * * *